United States Patent
Peng et al.

(10) Patent No.: US 7,841,565 B2
(45) Date of Patent: Nov. 30, 2010

(54) MOUNTING APPARATUS FOR DATA STORAGE DEVICES

(75) Inventors: Wen-Tang Peng, Tu-Cheng (TW); Xin-Hu Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1022 days.

(21) Appl. No.: 11/309,281

(22) Filed: Jul. 21, 2006

(65) Prior Publication Data

US 2007/0138921 A1 Jun. 21, 2007

(30) Foreign Application Priority Data

Nov. 15, 2005 (CN) .................. 2005 2 0067924 U

(51) Int. Cl.
*G12B 9/00* (2006.01)
(52) U.S. Cl. ................... 248/27.1; 312/223.1
(58) Field of Classification Search ............... 361/685, 361/726, 727; 312/223.1–223.2; 248/27.1, 248/27.3
See application file for complete search history.

(56) References Cited

U.S. PATENT DOCUMENTS

| | | | | |
|---|---|---|---|---|
| 4,816,966 A | * | 3/1989 | Frankowski | 361/641 |
| 5,683,159 A | * | 11/1997 | Johnson | 312/334.7 |
| 5,734,557 A | * | 3/1998 | McAnally et al. | 361/727 |
| 6,378,965 B1 | * | 4/2002 | Reznikov et al. | 312/332.1 |
| 6,813,148 B2 | * | 11/2004 | Hsu et al. | 361/679.39 |
| 6,885,550 B1 | * | 4/2005 | Williams | 361/679.33 |
| 7,102,886 B2 | * | 9/2006 | Peng et al. | 361/679.39 |
| 7,295,432 B2 | * | 11/2007 | Xu | 361/679.33 |
| 7,319,585 B2 | * | 1/2008 | Chou | 361/679.33 |
| 7,408,771 B2 | * | 8/2008 | Chen et al. | 361/679.33 |
| 7,448,702 B2 | * | 11/2008 | Chen et al. | 312/223.2 |
| 2002/0172014 A1 | * | 11/2002 | Lung | 361/725 |
| 2004/0075978 A1 | * | 4/2004 | Chen et al. | 361/685 |
| 2005/0103729 A1 | * | 5/2005 | Chen et al. | 211/26 |
| 2006/0231686 A1 | * | 10/2006 | Lin | 248/27.1 |

FOREIGN PATENT DOCUMENTS

| | | | | |
|---|---|---|---|---|
| CN | 200520055499 U | * | 5/2005 | |
| GB | 2162239 A | * | 1/1986 | |
| TW | 190919 | | 9/1992 | |
| TW | 211361 | | 8/1993 | |
| TW | 224797 | | 6/1994 | |

* cited by examiner

*Primary Examiner*—Kimberly T Wood
(74) *Attorney, Agent, or Firm*—Wei Te Chung

(57) ABSTRACT

A mounting apparatus for a data storage device defining a locking hole in a sidewall includes a bracket, a lever member, and an operating member. The bracket includes a first side wall. The side wall defines a through-hole, and an opening. The lever member mounted to the first side wall includes an extension portion at an end thereof that extends through the opening, and a cantilever at an opposite end thereof. The cantilever includes a first guiding portion, and a locking portion at a distal end thereof for inserting through the through-hole of the bracket to engage in the locking hole of the data storage device. The operating member is mounted to the first side wall of the bracket and movable along the cantilever of the lever member. The operating member includes a second guiding portion for slidably engaging with the first guiding portion of the lever member.

14 Claims, 9 Drawing Sheets

MOUNTING APPARATUS FOR DATA STORAGE DEVICES

FIELD OF THE INVENTION

The present invention relates to mounting apparatuses, and particularly to a mounting apparatus readily allowing installation or removal of a data storage device thereto or therefrom.

DESCRIPTION OF PRIOR ART

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

A conventional data storage device is generally attached to a drive bracket by bolts or rails. Examples are disclosed in Taiwan Patent Application Nos. 82202124, 81207129, and 82207667. Fixing a data storage device to a drive bracket with bolts is unduly laborious and time-consuming. Furthermore, the computer enclosure needs extra operating space for carrying out repairs. Repairing a data storage device in a drive bracket with rails is more convenient than using the above-described bolts. However, certain bolts are still needed to fix the rails to the drive bracket. Additionally, mounting systems using rails require a clearance between the data storage device and the drive bracket. This may cause electromagnetic interference (EMI) problems, and may lead to accumulation of static charges on the computer enclosure. Furthermore, the rails are generally made of plastic. This not only restricts grounding connection options between the data storage device and the drive bracket, but also tends to lead to extra maintenance, because plastic rails may easily wear out and require replacement.

What is desired, therefore, is a mounting apparatus which readily allows installation or removal of a data storage device thereto or therefrom.

SUMMARY OF THE INVENTION

An exemplary mounting apparatus for a data storage device defining a locking hole in a sidewall includes a bracket, a lever member, and an operating member. The bracket includes a first side wall. The side wall defines a through-hole, and an opening. The lever member mounted to the first side wall of the bracket includes an extension portion at an end thereof that extends through the opening of the bracket, and a cantilever at an opposite end thereof. The cantilever includes a first guiding portion, and a locking portion at a distal end thereof for inserting through the through-hole of the bracket to engage in the locking hole of the data storage device. The operating member is mounted to the first side wall of the bracket and movable along the cantilever of the lever member. The operating member includes a second guiding portion for slidably engaging with the first guiding portion of the lever member.

Other advantages and novel features will become more apparent from the following detailed description when taken in conjunction with the accompanying drawings, in which:

DETAILED DESCRIPTION OF THE INVENTION

Figure 1:
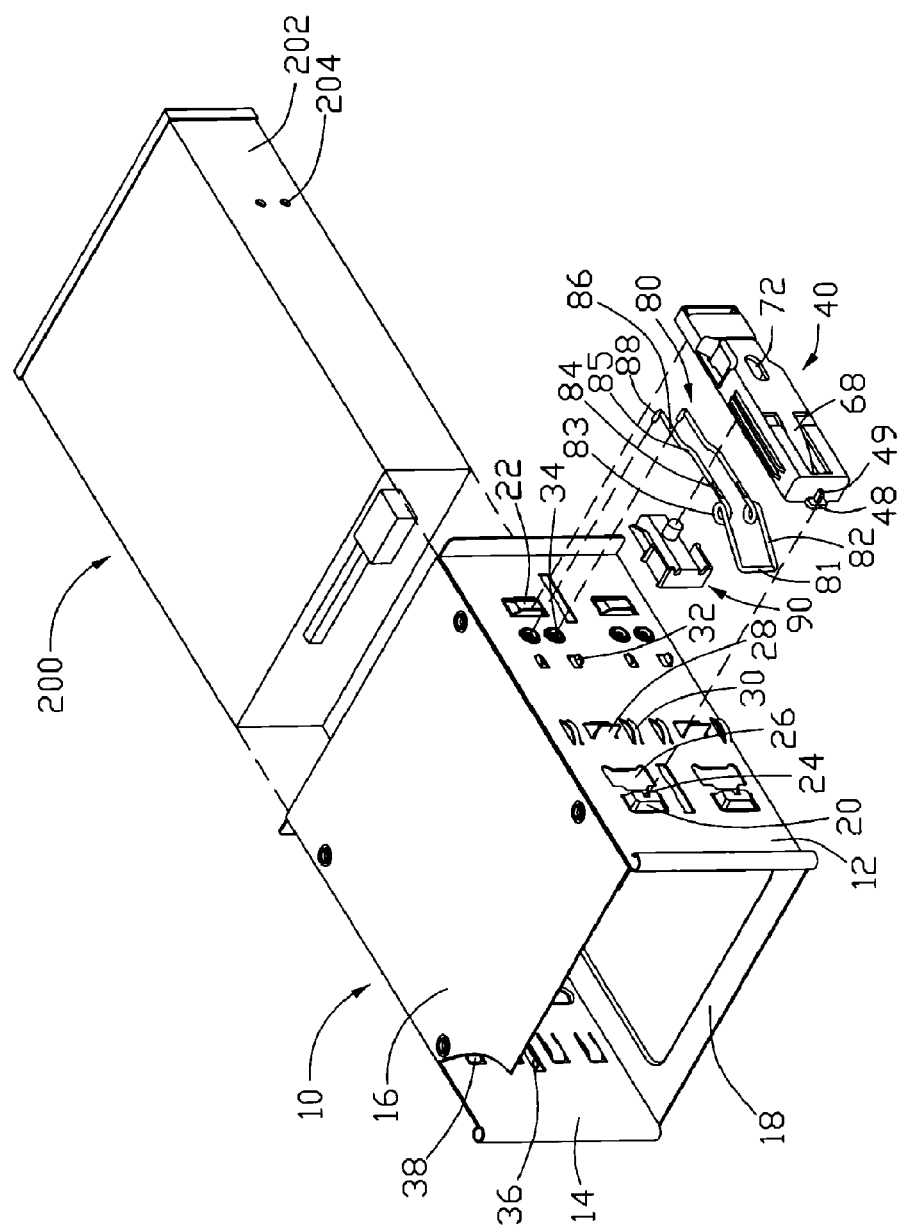
FIG. 1 is an exploded, isometric view of a mounting apparatus for a data storage device in accordance with a preferred embodiment of the present invention, together with a data storage device, the mounting apparatus includes a bracket, an operating member, a lever member, and a mounting member.

Referring to FIG. 1, a mounting apparatus in accordance with a preferred embodiment of the present invention is shown for mounting a data storage device 200 to a computer enclosure. The data storage device 200 defines a pair of locking holes 204 in a sidewall 202 thereof. The mounting apparatus includes a bracket 10 mounted to the computer enclosure, a mounting member 40, a resilient lever member 80, and an operating member 90.

The bracket 10 includes a first side wall 12, a second side wall 14, a top wall 16 connecting tops of the first side wall 12 and the second side wall 14, and a bottom wall 18 connecting bottoms of the first side wall 12 and the second side wall 14. A first catch 20 and a second catch 22 opposite to each other are stamped out from opposite ends of the first side wall 12. The first catch 20 and the second catch 22 are connected with the first side wall 12 via three sides thereof respectively. Thus, a first receiving space having an entrance facing the second catch 22 is formed between the first catch 20 and the first side wall 12. A second receiving space having an entrance facing the first catch 20 is formed between the second catch 22 and the first side wall 12. A cutout 24 communicating with the entrance of the first catch 20 is defined in the first catch 20. An opening 26 is defined in the first side wall 12 between the first catch 20 and the second catch 22, and adjacent the first catch 20. Two arc-shaped restricting tabs 30 are stamped out from the first side wall 12, and located between the opening 26 and the second catch 22. A blocking tab 28 is stamped out from the first side wall 12 and located between the two restricting tabs 30. Two orientating tabs 32 are stamped out from the first side wall 12 and located between the blocking tab 28 and the second catch 22. Two through-holes 34 are defined in the first side wall 12 and located between the orientating tabs 32 and the second catch 22. A row of supporting plates 36 parallel to the bottom wall 18 is stamped in from the second side wall 14. A plurality of resilient tabs 38 is stamped in from the second side wall 14 and located between the top wall 16 and the supporting plates 36.

Figure 2:
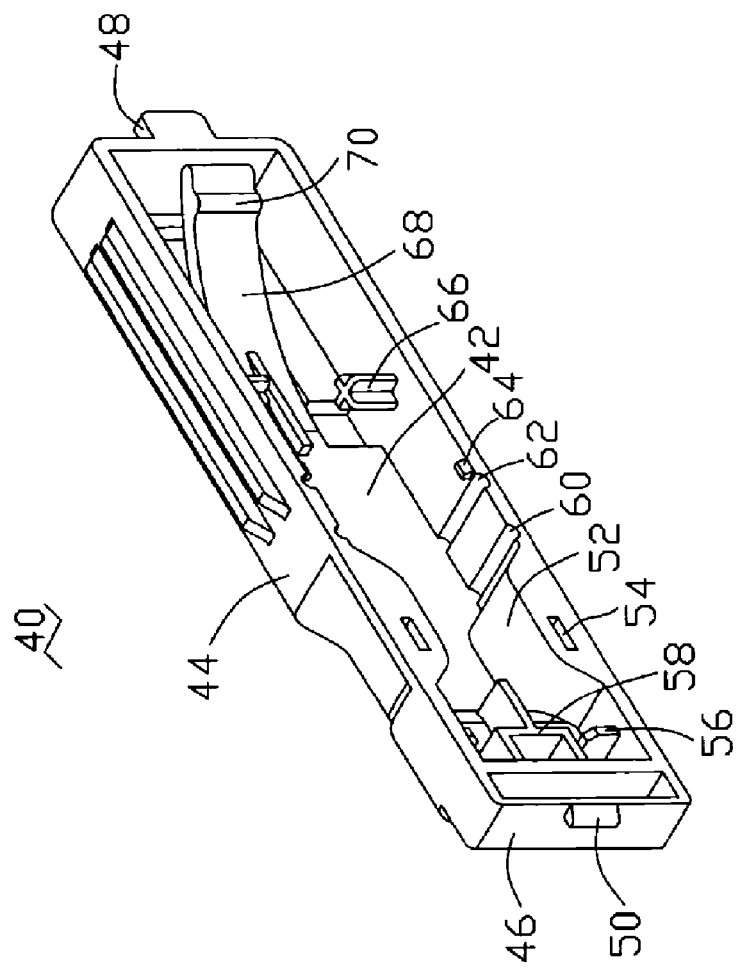
FIG. 2 is an enlarged, isometric view of the mounting member of FIG. 1, but viewed from another aspect.

Referring also to FIG. 2, the mounting member 40 includes a main plate 42 parallel to the first side wall 12 of the bracket 10, a pair of side plates 44 extending toward the first side wall 12 of the bracket 10 from top and bottom sides of the main plate 42, and a pair of end plates 46 extending toward the first side wall 12 of the bracket 10 from opposite ends of the main plate 42. The main plate 42, the side plates 44, and the end plates 46 enclose a mounting space. A first projecting tab 48 protrudes from one end plate of the pair of end plates 46. A second projecting tab 49 extends from a junction of the first projecting tab 48 and the corresponding end plate 46. A protrusion 50 protrudes from the other end plate of the pair of end plates 46. Two bulges 52 protrude from the side plates 44 adjacent the protrusion 50 into the mounting space. An orientating hole 54 is defined in each bulge 52 facing the first side wall 12. Two hampering plates 56 opposite to each other extend into the mounting space from the corresponding side plates 44 and are between the bulges 52 and the protrusion 50. A Y-shaped limiting tab 58 extends into the mounting space and is located between the hampering plates 56. A first locating slot 60 is defined in each side plate 44 and at a side of a corresponding bulge 52 opposite to the hampering plate 56. A second locating slot 62 parallel to the first locating slot 60 is defined in each side plate 44 and at a side of the first locating slot 62 opposite to the corresponding bulge 52. A first blocking protrusion 64 protrudes from each side plate 44 and at a side of the second locating slots 62 opposite to the first locating slots 60. Two shafts 66 opposite to each other extend into the mounting space from the side plates 44 respectively. A resilient tongue-shaped portion 68 extends into the mounting space from the main plate 42. A securing portion 70 decumbently protrudes from the resilient tongue-shaped portion 68 adjacent a distal end. A sliding slot 72 is defined in the main plate 42.

The lever member 80 made from a wire includes a main part 81, and a pair of arms. Each arm includes an extension portion 82 extending toward the mounting member 40 from a corresponding end of the main part 81, a cantilever, and a curled mounting portion 83 defining a pivot hole (not labeled) therein between the extension portion 82 and the cantilever. The cantilever includes a connecting portion 84 parallel to the main plate 42 of the mounting member 40, a first guiding portion 85 slantingly extending toward the first side wall 12 from a distal end of the connecting portion 84, an end portion 86 parallel to the main plate 42 of the mounting member 40 extending from a distal end of the first guiding portion 85, and a locking portion 88 perpendicularly extending from a distal end of the end portion 86. The mounting portion 83 connects the extension portion 82 and the connecting portion 84.

Figure 3:
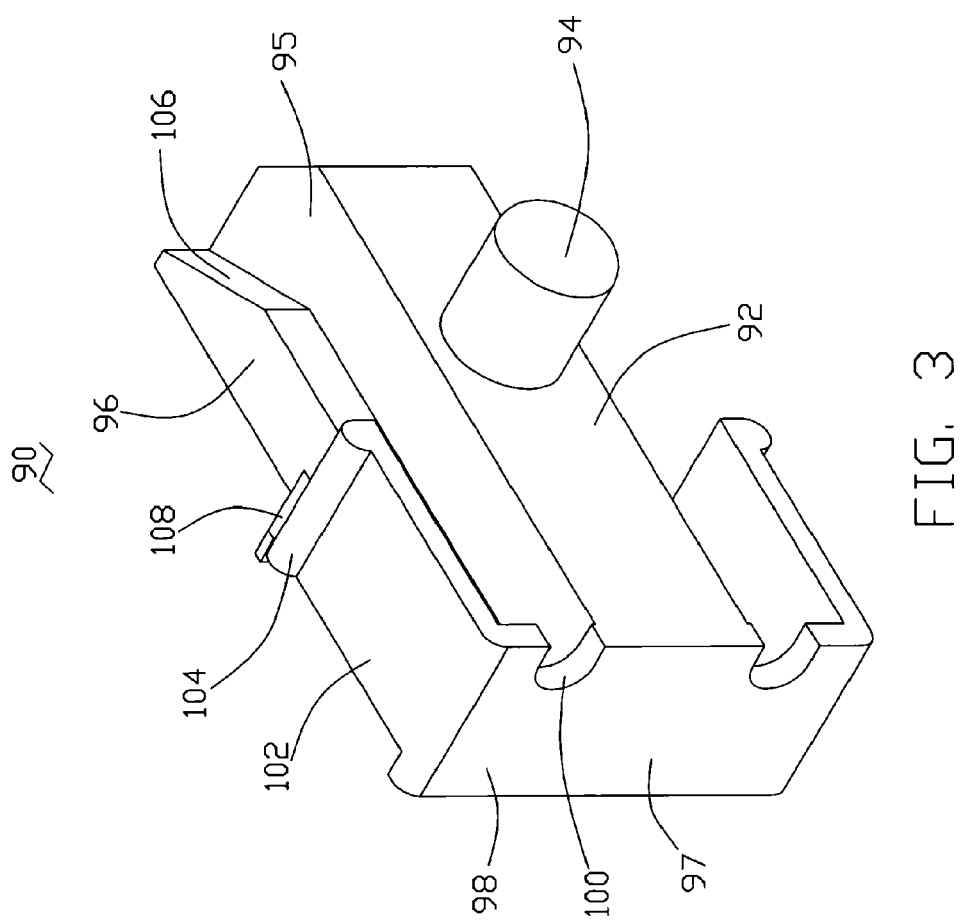
FIG. 3 is an enlarged, isometric view of the operating member of FIG. 1.
Figure 4:
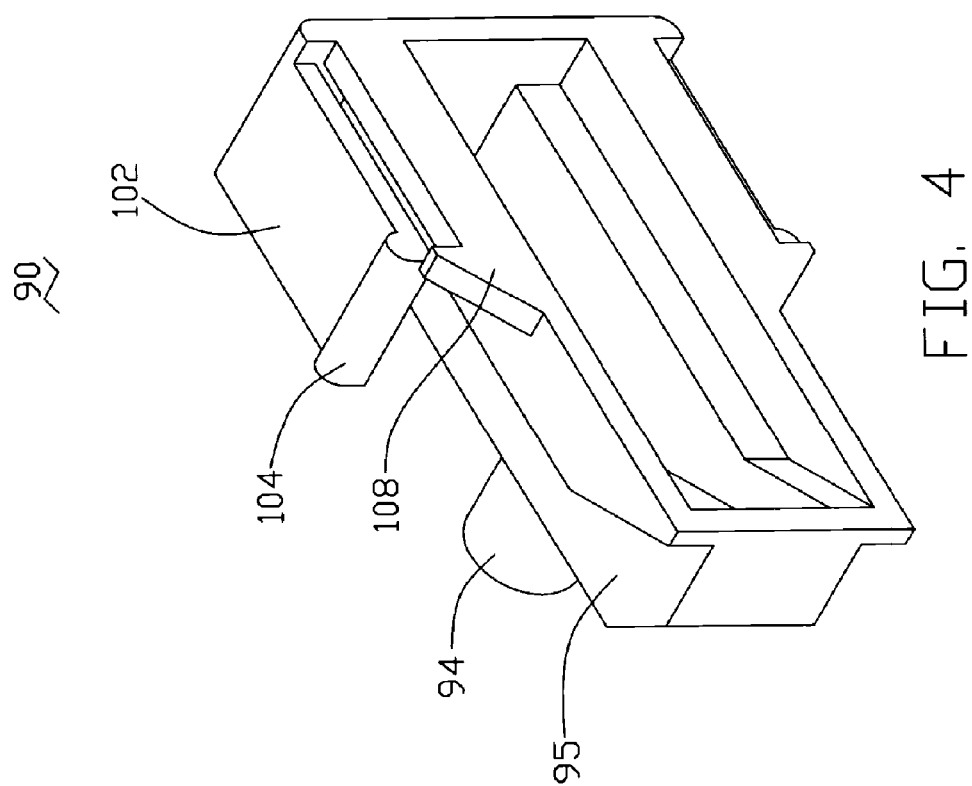
FIG. 4 is similar to FIG. 3, but viewed from another aspect.

Referring to FIGS. 3 and 4, the operating member 90 includes a body 92. A post 94 extending from the body 92 away from the first side wall 12. A pair of side boards 95 extends from top and bottom sides of the body 92 opposite to the post 94. A projecting member 96 extends out from a lower portion of each side board 95. A connecting board 97 connects corresponding ends of the side boards 95. Two extension boards 98 extend from opposite sides of the connecting board 97 respectively. A receiving slot 100 is defined in each extension board 98. Two resilient wings 102 perpendicularly extend from distal ends of the extension boards 98. A locating portion 104 protrudes out from a distal end of each wing 102. A slanting second guiding portion 106 is formed at one end of each projecting member 96 opposite to a corresponding wing 102. A second blocking protrusion 108 extends from each projecting member 96 adjacent the corresponding locating portion 104.

Figure 5:
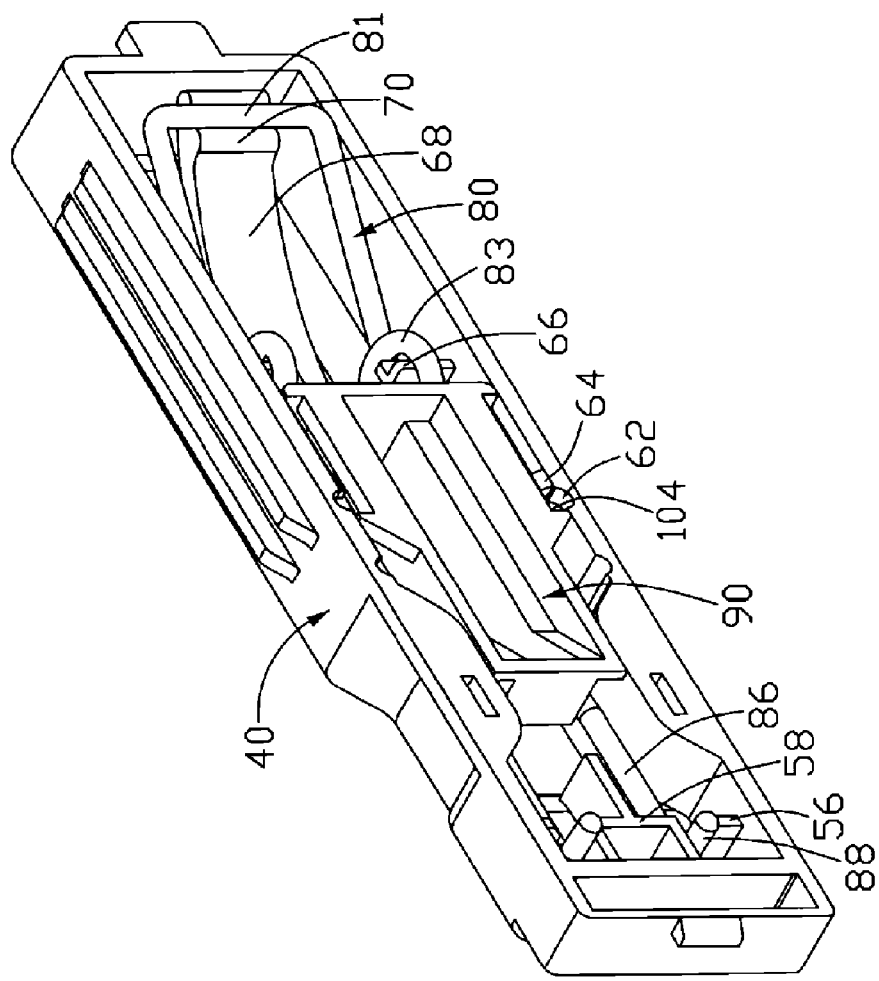
FIG. 5 is an assembled view of the mounting member, the lever member, and the operating member of FIG. 1, but viewed from another aspect.

Referring also to FIG. 5, in assembling the lever member 80 and the operating member 90 to the mounting member 40, the mounting portions 83 of the lever member 80 fit about the corresponding shafts 66 of the mounting member 40. Each end portion 86 of the lever member 80 is accommodated between the limiting tab 58 and a corresponding hampering plate 56. The main part 81 of the lever member 80 is located on a distal end of the resilient tongue-shaped portion 68 of the mounting member 40, and is resiliently depressed by the tongue-shaped portion 68 and the securing portion 70. The operating member 90 is inserted into the mounting space of the mounting member 40. The post 94 of the operating member 90 is inserted through the sliding slot 72 of the mounting member 40. The receiving slots 100 of the operating member 90 accommodate the corresponding connecting portions 84 of the lever member 80. The wings 102 of the operating member 90 are blocked by the blocking protrusions 64 of the mounting member 40.

Figure 6:
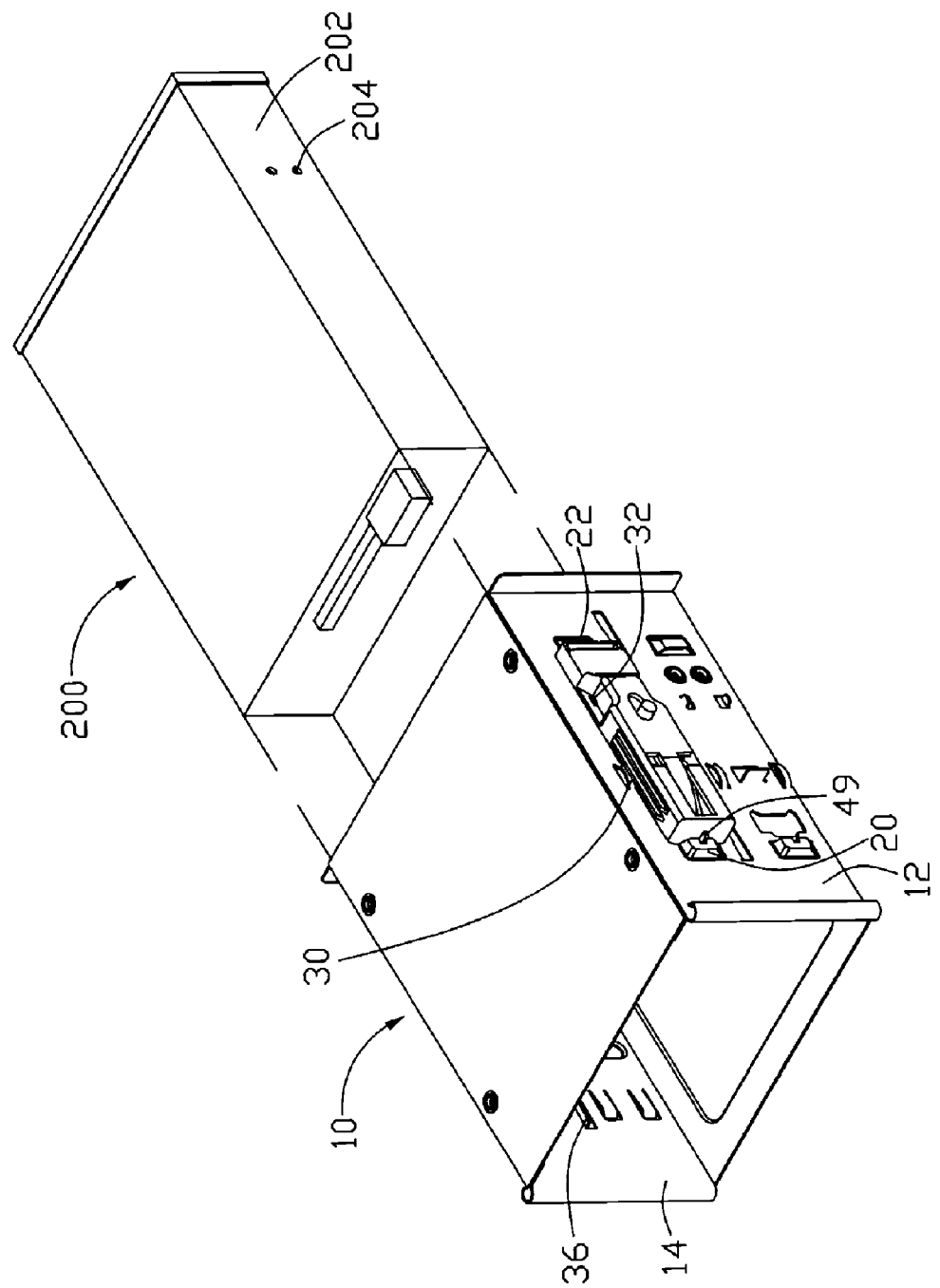
FIG. 6 is an assembled view of the mounting apparatus, together with the data storage device separate therefrom.

Referring also to FIG. 6, in assembling the combined assembly of the mounting member 40, the lever member 80, and the operating member 90 to the bracket 10, the first projecting tab 48 of the mounting member 40 is received in the first receiving space under the first catch 20 of the bracket 10. The second projecting tab 49 of the mounting member 40 is received in the cutout 24 of the bracket 10. The combined assembly of the mounting member 40, the lever member 80, and the operating member 90 is rotated. The end having the protrusion 50 of the mounting member 40 is pressed. The protrusion 50 is received in the second receiving space under the second catch 22 of the bracket 10. The blocking tab 28 of the bracket 10 is located between the shafts 66 of the mounting member 40 to prevent the mounting portions 83 of the lever member 80 from disengaging from the corresponding shafts 66. The mounting member 40 is located between the restricting tabs 30. The orientating tabs 32 of the bracket 10 are engaged in the corresponding orientating holes 54 of the mounting member 40. The distal end of the tongue-shaped portion 68 of the mounting member 40 and the main part 81 of the lever member 80 are inserted into the bracket 10 through the opening 26. Thus, the combined assembly of the mounting member 40, the lever member 80, and the operating member 90 is secured to the bracket 10. The locking portions 88 of the lever member 80 are in alignment with the corresponding through-holes 34 of the bracket 10.

Figure 7:
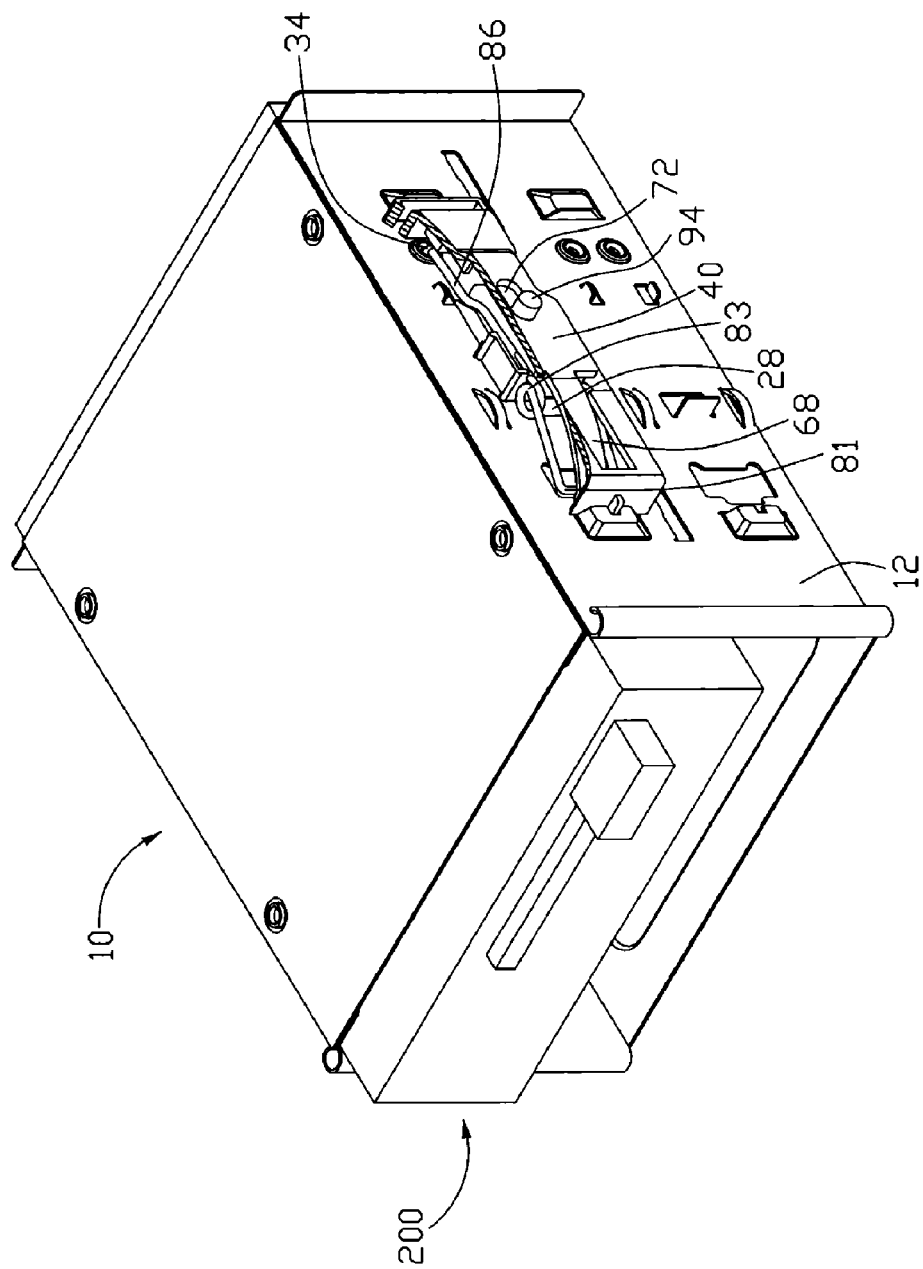
FIG. 7 is an assembled view of FIG. 1, but partially cut away, showing the lever member locking the data storage device.
Figure 8:
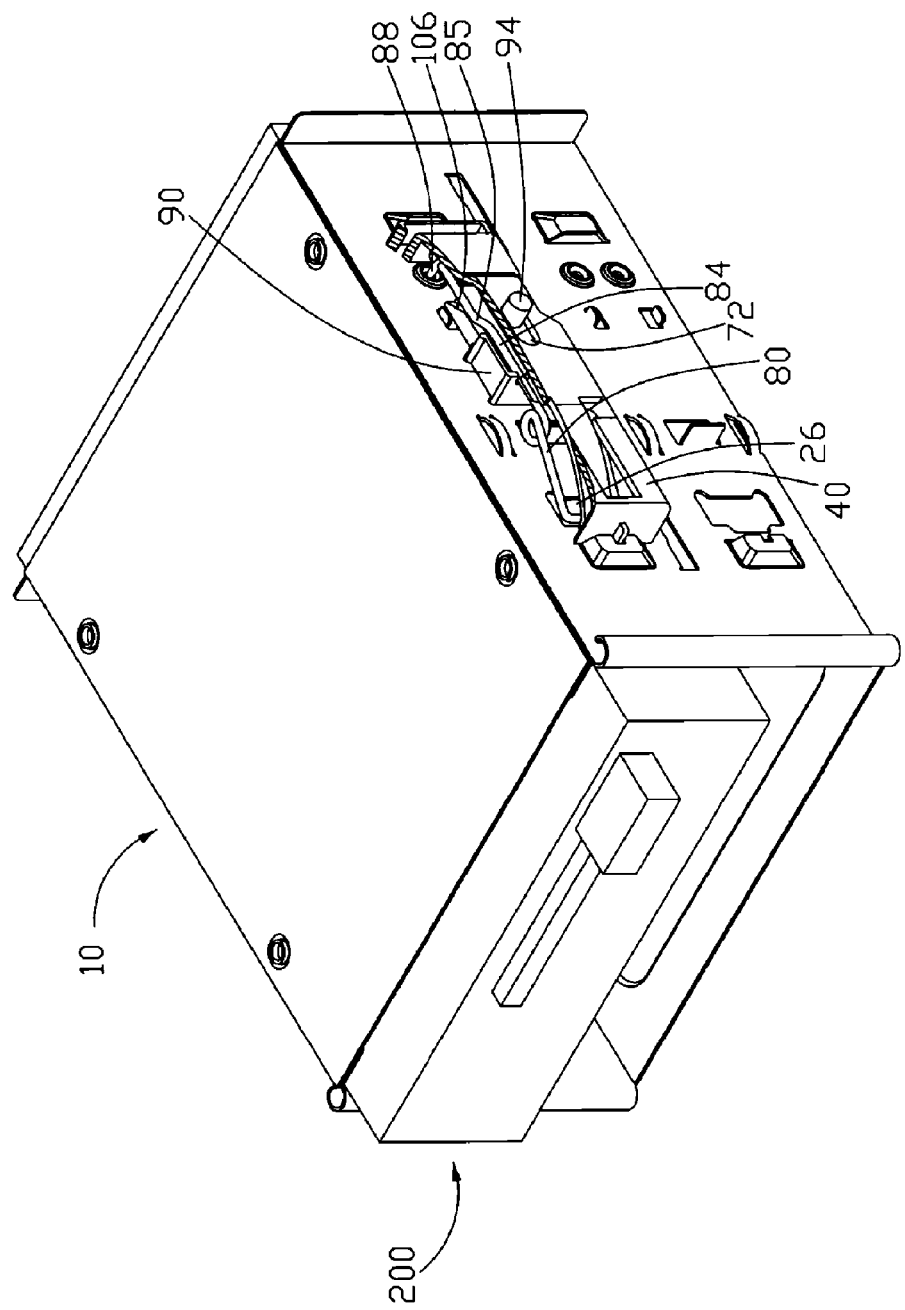
FIG. 8 is similar to FIG. 7, but showing the lever member unlocking the data storage device.
Figure 9:
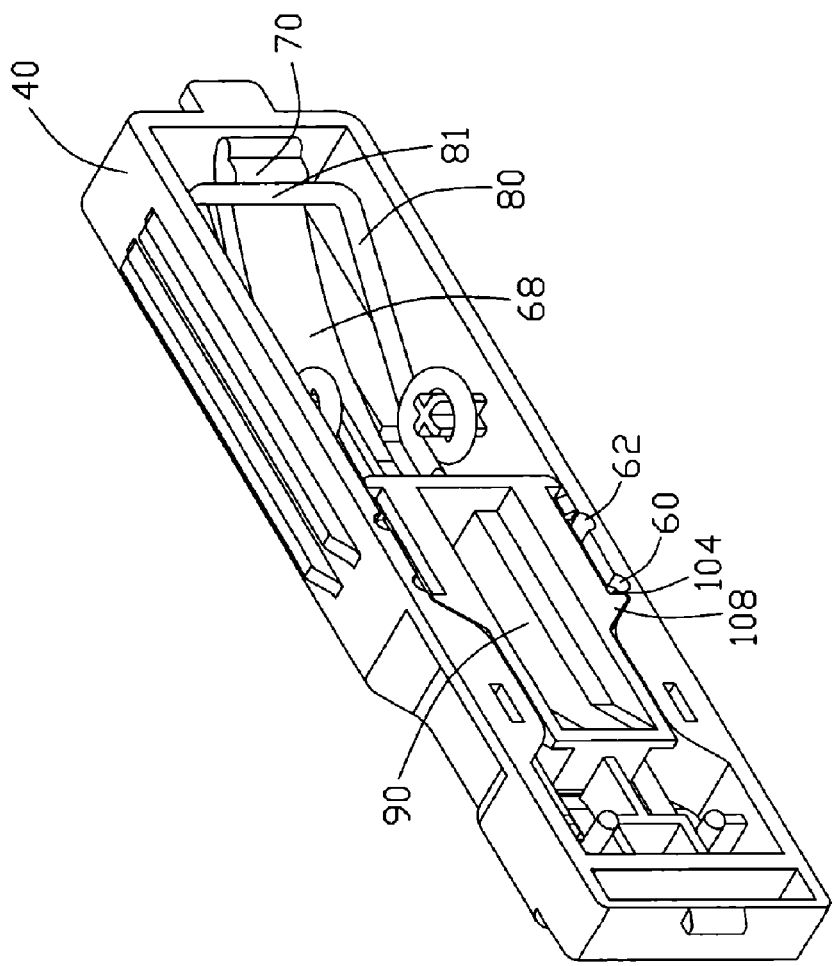
FIG. 9 is an assembled view of the mounting member, the lever member, and the operating member of FIG. 8, but viewed from another aspect.

Referring also to FIGS. 7-9, in preparation for assembling the data storage device 200, pushing the post 94 causes the operating member 90 to move in a direction toward the tongue-shaped portion 68 of the mounting member 40. The locating portions 104 of the operating member 90 are received in the corresponding second locating slots 62 of the mounting member 40. The locking portions 88 of the lever member 80 are not penetrating beyond edges of the corresponding through-holes 34 of the first side wall 12 of the bracket 10. The main part 81 of the lever member 80 is located on the tongue-shaped portion 68 of the mounting member 40 and between the securing portion 70 and the distal end of the resilient member 68.

In assembling the data storage device 200, the data storage device 200 is inserted into the bracket 10 and slides on the supporting plates 36 of the second side wall 14 of the bracket 10. An end of the data storage device 200 pushes the main part 81 of the lever member 80 and the resilient tongue-shaped portion 68 to move out. The mounting portions 83 of the lever member 80 rotate around the corresponding shafts 66 of the mounting member 40. The locking portions 88 of the lever member 80 pass through the corresponding through-holes 34 of the first side wall 12 of the bracket 10 and are resiliently depressed by the sidewall 202 of the data storage device 200. The data storage device 200 is further pushed. The locking portions 88 of the lever member 80 engage with the corresponding locking holes 204 of the data storage device 200. The main part 81 of the lever member 80 moves along a surface of the securing portion 70 of the tongue-shaped portion 68, and then is located at a side of the securing portion 70 opposite to the distal end of the tongue-shaped portion 68. The resilient tabs 38 of the second side wall 14 of the bracket 10 are elastically attached to an opposite sidewall of the data storage device 200. Thus, the data storage device 200 is secured.

In disassembling the data storage device 200, pushing the post 94 of the operating member 90 to move in a direction away from the tongue-shaped portion 68 of the mounting member 40 causes the locating portions 104 of the operating member 90, to move from corresponding second locating slots 62 to corresponding first locating slots 60. The second guiding portions 106 of the operating member 90 slidably engage with the corresponding first guiding portions 85 of the lever member 80, to push the first guiding portions 85 and the end portions 86 of the lever member 80 to move away from the first side wall 12 of the bracket 10. The locking portions 88 of the lever member 80 disengage from the corresponding locking holes 204 of the data storage device 200. Thus, the data storage device 200 can be removed from the bracket 10.

In an alternative embodiment of the present invention, the lever member 80 may be directly mounted to first side wall 12 of the bracket 10 via two shafts (not shown) that extend from the first side wall 12.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A mounting apparatus for mounting a data storage device that defines a locking hole in a sidewall, comprising:
   a bracket for holding the data storage device, the bracket comprising a first side wall that defines a through-hole, and an opening;
   a lever member mounted to the first side wall of the bracket, the lever member comprising an extension portion at an end thereof that extends through the opening of the bracket, and a cantilever at an opposite end thereof, the cantilever comprising a first guiding portion, and a locking portion at a distal end thereof for inserting through the through-hole of the bracket to engage in the locking hole of the data storage device; and
   an operating member mounted to the first side wall of the bracket, the operating member movable along the cantilever of the lever member, the operating member comprising a second guiding portion for slidably engaging with the first guiding portion of the lever member.

2. The mounting apparatus as claimed in claim 1, wherein the lever member further comprises a mounting portion, for mounting the lever member to the first side wall.

3. The mounting apparatus as claimed in claim 2, wherein the cantilever being resilient further comprises a connecting portion adjacent the mounting portion and parallel to the first side wall of the bracket, and an end portion away from the mounting portion and parallel to the first side wall of the bracket, the first guiding portion is slantingly extending toward the first side wall between the connecting portion and the end portion.

4. The mounting apparatus as claimed in claim 3, wherein the locking portion is perpendicularly extending from a distal end of the end portion.

5. The mounting apparatus as claimed in claim 4, further comprising a mounting member mounted to the first side wall of the bracket, wherein the lever member and the operating member are attached to the mounting member.

6. The mounting apparatus as claimed in claim 5, wherein the mounting member comprises a main plate defining a sliding slot, the operating member further comprises a post extending out for slidably received in the sliding slot.

7. The mounting apparatus as claimed in claim 6, wherein the main plate is parallel to the first side wall of the bracket, the mounting member further comprises a side plate perpendicularly extending toward the first side wall of the bracket from the main plate, a shaft extends from the side plate, for fitting about the mounting portion of the lever member.

8. The mounting apparatus as claimed in claim 6, wherein the mounting member still further comprises two end plates perpendicularly extending toward the first side wall of the bracket from opposite ends of the main plate, two projecting tabs protrude out from the end plates respectively, two catches are stamped out from the first side wall of the bracket for receiving the corresponding projecting tabs.

9. The mounting apparatus as claimed in claim 7, wherein the operating member is selectively located in two positions of the mounting member.

10. The mounting apparatus as claimed in claim 9, wherein a first locating slot and a second locating slot parallel to each other are defined in an inner surface of the side plate of the mounting member, the operating member comprises a resilient wing, a locating portion protrudes from the wing for being selectively received in the first and second locating slots of the mounting member.

11. The mounting apparatus as claimed in claim 6, wherein a resilient tongue-shaped portion extends from the main plate toward the opening of the first side wall of the bracket, the lever member further comprises a main part, the extension portion perpendicularly extends from the main part, the main part is located on the tongue-shaped portion of the mounting member.

12. The mounting apparatus as claimed in claim 11, wherein a securing portion protrudes from a surface of the tongue-shaped portion facing the opening and adjacent a distal end of the tongue-shaped portion, the main part is located between the distal end of the tongue-shaped portion and the securing portion when the data storage device not being received in the bracket, the main part is located at a side of the securing portion opposite to the distal end of the tongue-shaped portion when the data storage device being received in the bracket.

13. The mounting apparatus as claimed in claim 12, wherein the lever member still further comprises another extension portion perpendicularly extending from the main part opposite to the extension portion, another connection portion, another mounting portion connecting the another extension portion to the another connection portion, another end portion, another first guiding portion slantingly extending from a distal end of the another connection portion toward the another end portion, and another locking portion perpendicularly extending from a distal end of the another end portion; and wherein the another end portion extends from a distal end of the another first guiding portion.

14. The mounting apparatus as claimed in claim 12, wherein the main part extends into the bracket through the opening and the locking portion is in alignment with the through-hole of the bracket when the main part is located between the securing portion and the distal end of the tongue-shaped portion; and the main part is moved out of the bracket and the locking portion is inserted through the through-hole of the bracket to engage in the locking hole of the data storage device when the main part is located at a side of the securing portion opposite to the distal end of the tongue-shaped portion.

* * * * *